Patented Apr. 1, 1930

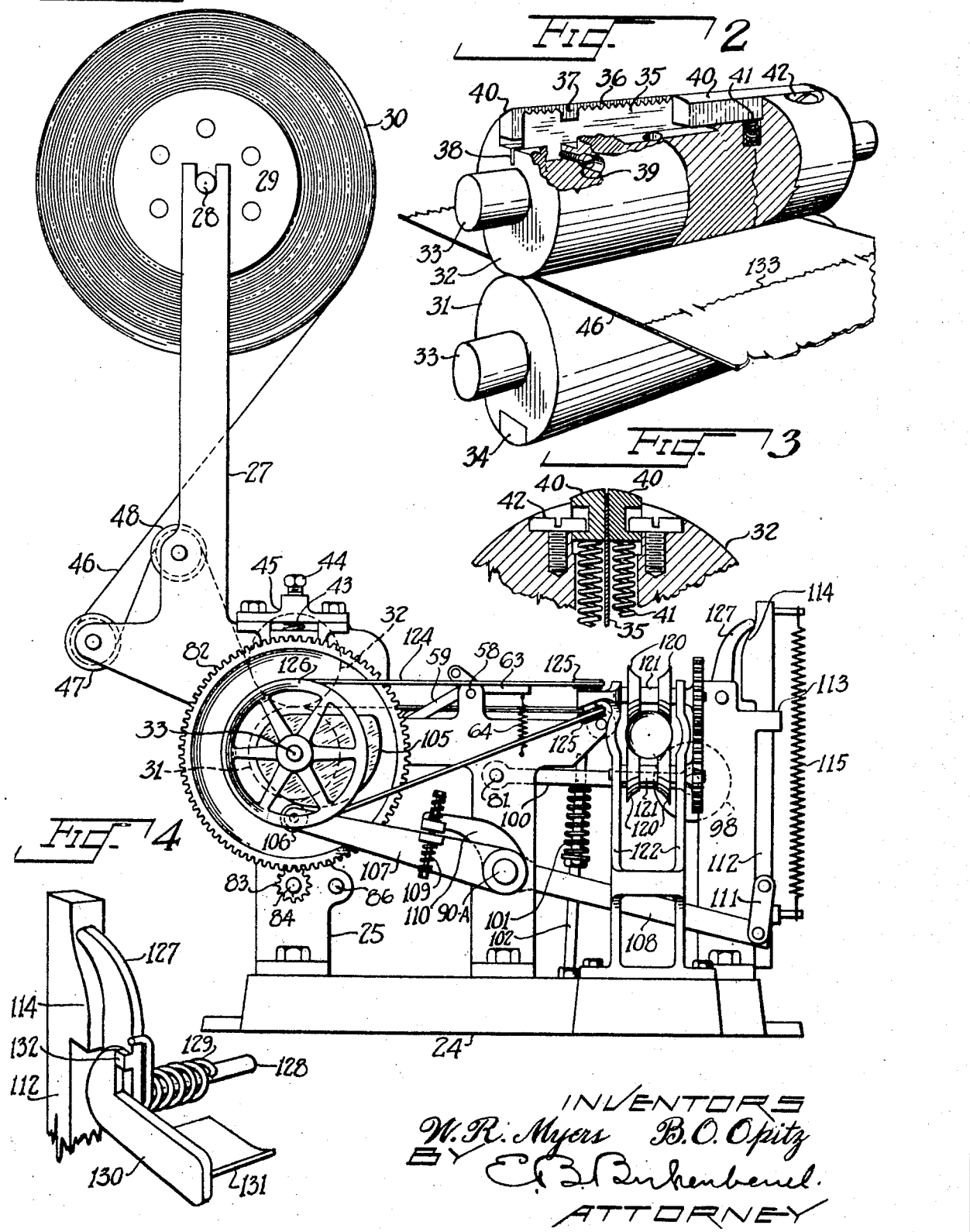

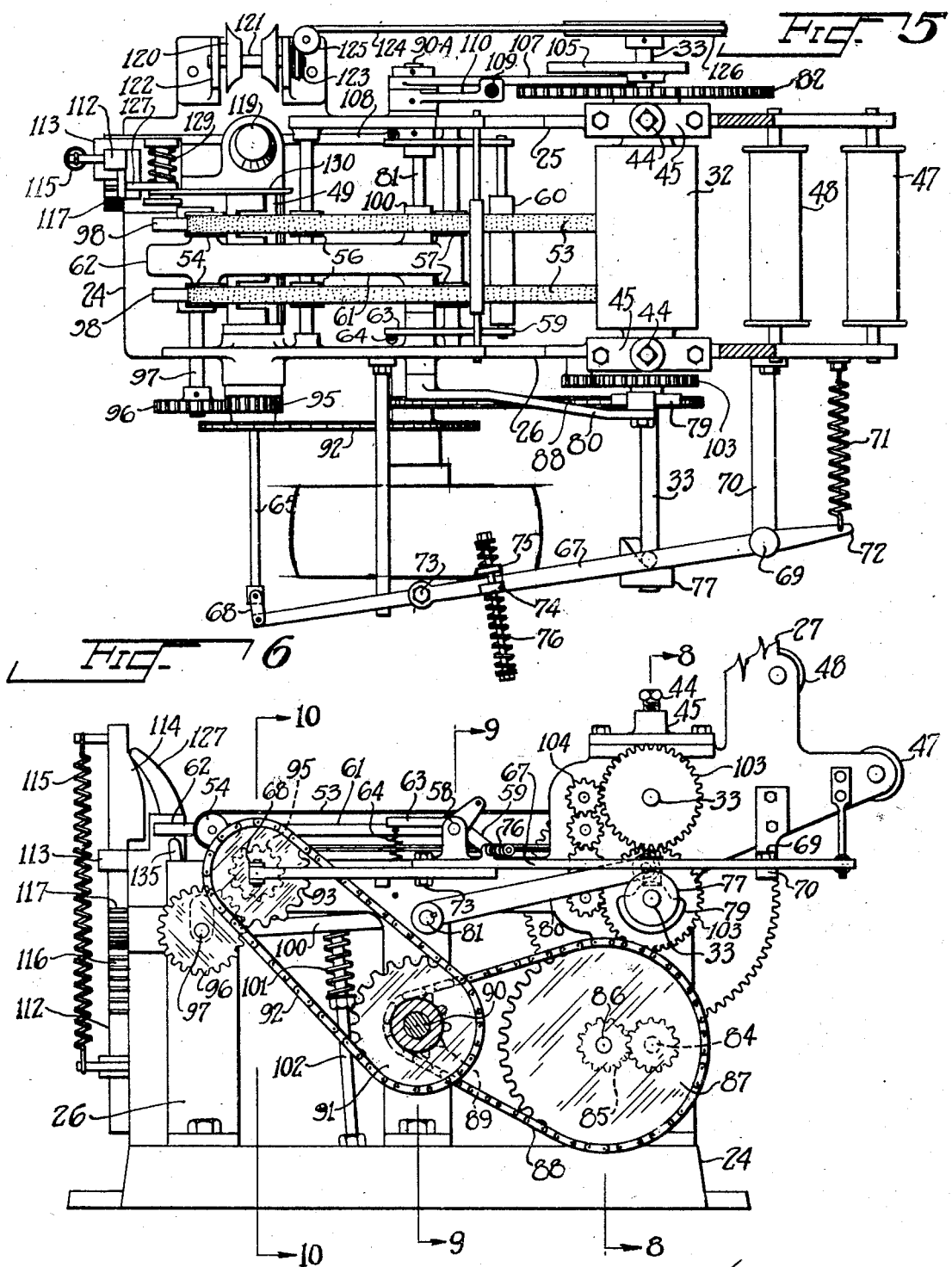

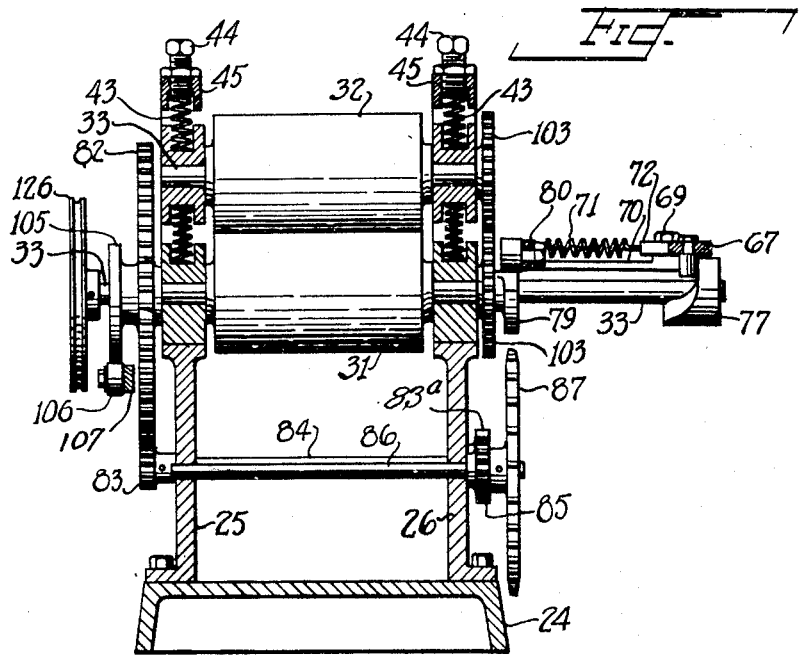
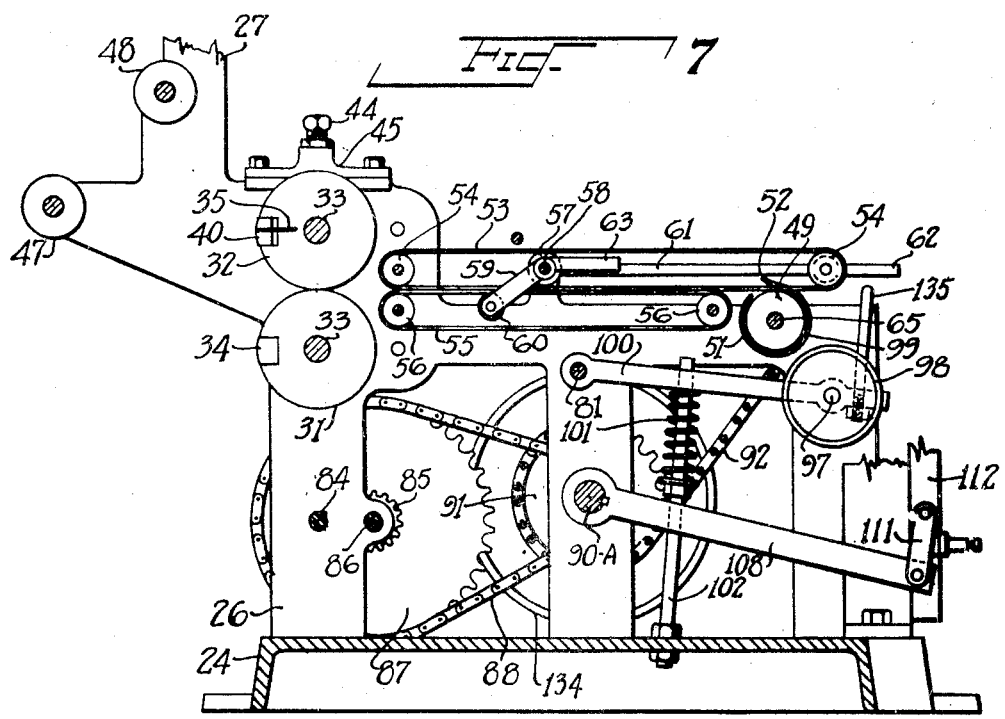

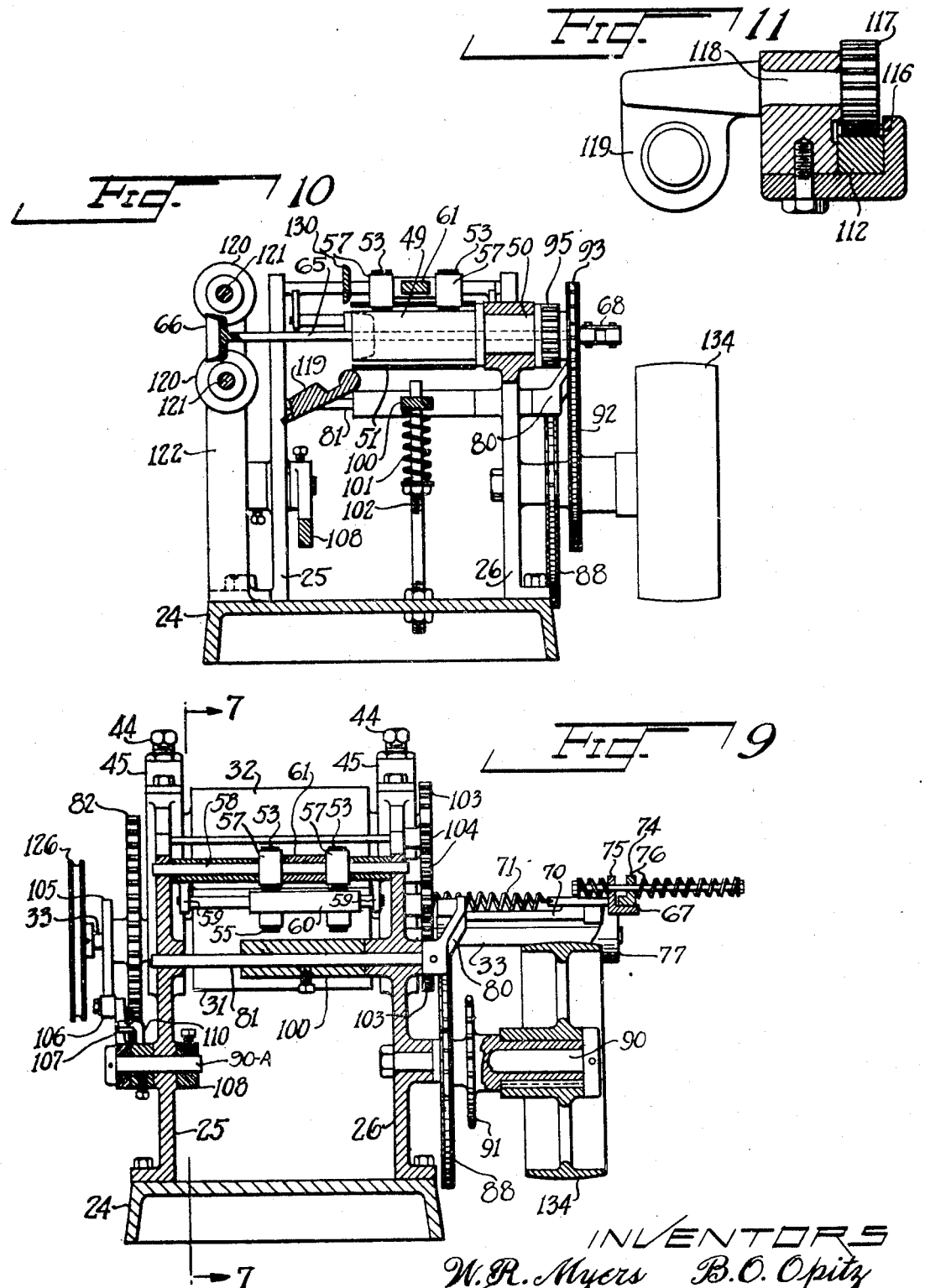

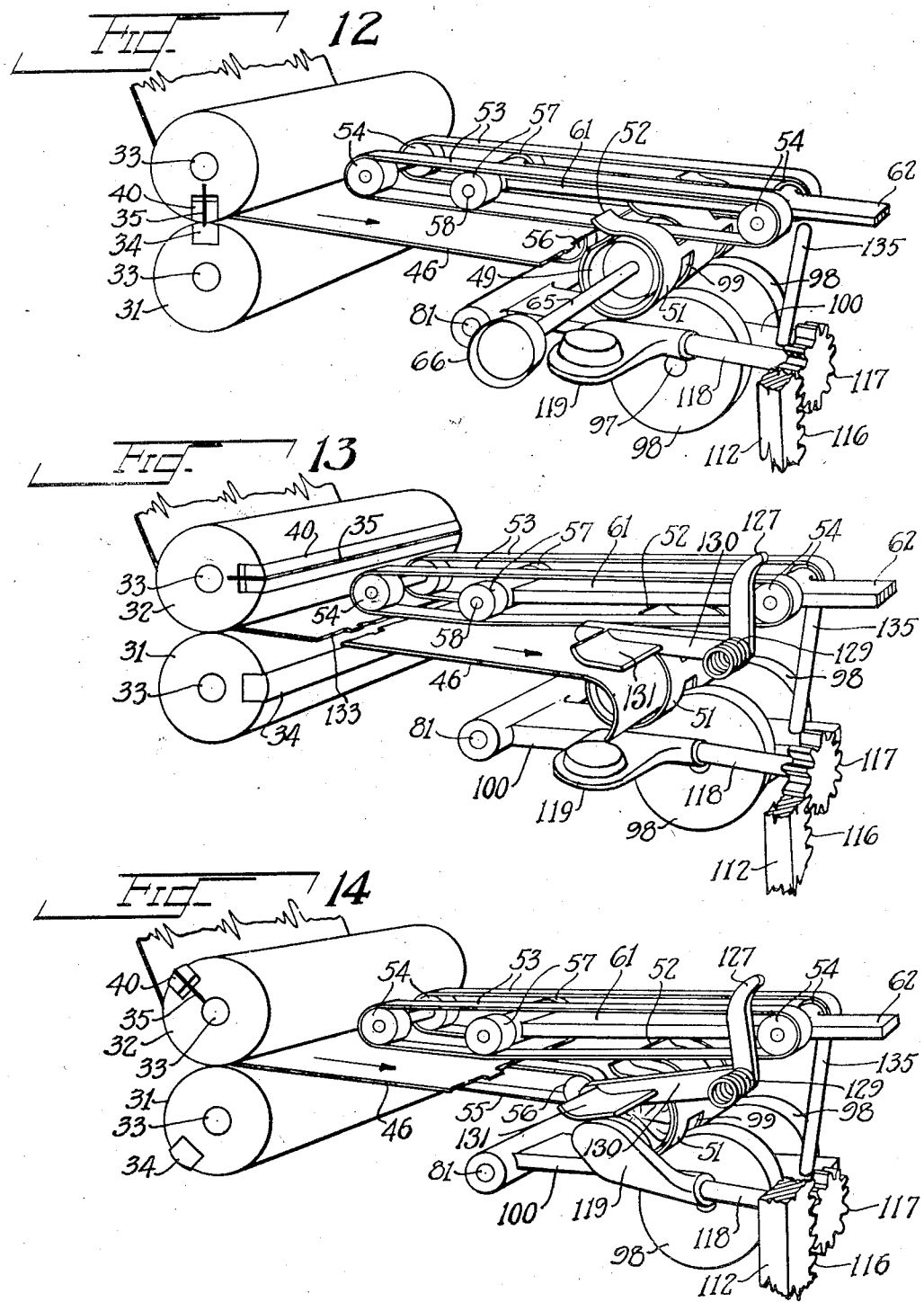

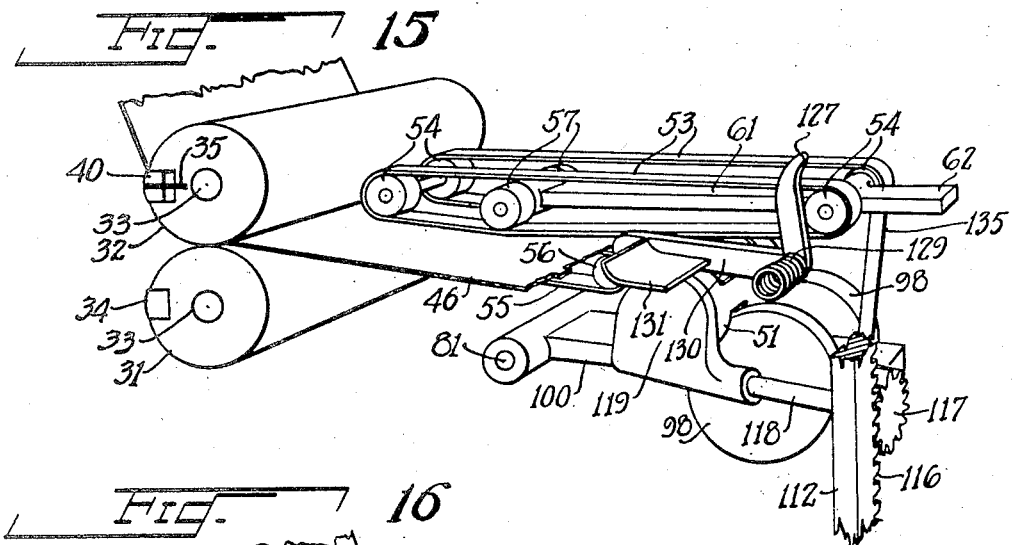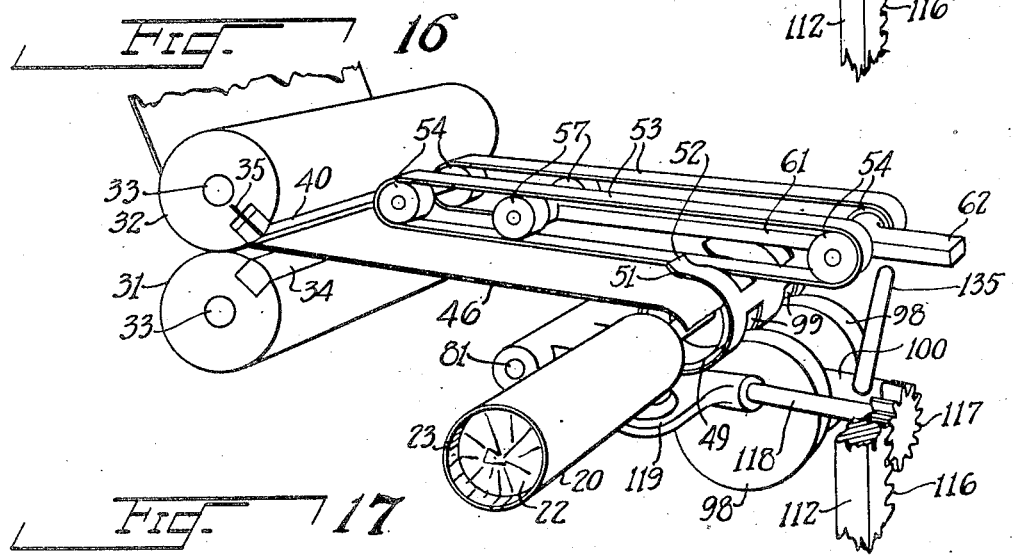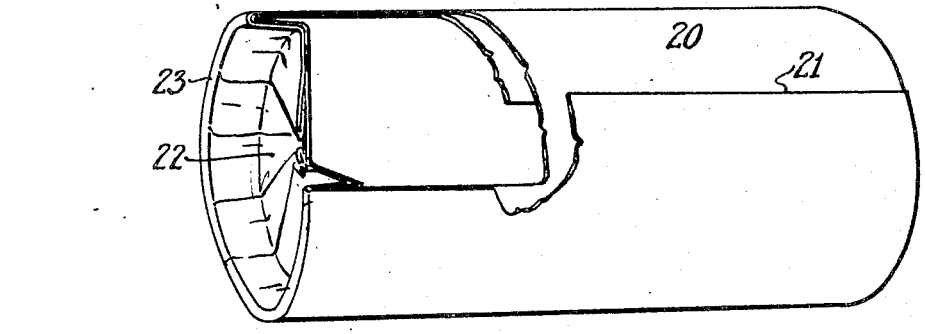

1,752,995

UNITED STATES PATENT OFFICE

WILSON R. MYERS AND BERNHARD O. OPITZ, OF PORTLAND, OREGON, ASSIGNORS, BY MESNE ASSIGNMENTS, TO ICE CREAM SMACK CORPORATION, A CORPORATION OF DELAWARE

CYLINDER-FORMING MACHINE

Application filed March 1, 1927. Serial No. 171,792.

This invention relates generally to the confectioner's art, and particularly to a special form of machine for forming cylinders out of paper, foil or other sheet material.

The first object of this invention is to provide an exceedingly simple and efficient machine for forming cylinders out of sheet material such as paper or foil, said cylinders having one closed end adapted to form the cylinder into a container for confections.

The second object is to employ wrapper stock in roll form and cut same off as it is used in the machine.

The third object is to eliminate as far as possible all contact between the cylinders and the fingers of the operators.

These, and other objects, will become more apparent from the specification following as illustrated in the accompanying drawings, in which:

Fig. 1 is an elevation of the machine from its discharge end. Fig. 2 is a perspective view of the feed rolls which have a portion broken away to show the cut-off knife. Fig. 3 is a transverse section through the feed roll having the cut-off knife showing the knife and its supports at an enlarged scale. Fig. 4 is a perspective view showing in detail the trip cam and its associated levers. Fig. 5 is a plan of the machine showing the paper roll supports in horizontal section, the roll being omitted. Fig. 6 is an elevation of the machine from its drive side, the drive pulley being omitted and the hub of the sprocket 91, and the shaft 90 being shown in section. Fig. 7 is a section taken along the line 7—7 in Fig. 9. Fig. 8 is a section taken along the line 8—8 in Fig. 6. Fig. 9 is a section taken along the line 9—9 in Fig. 6. Fig. 10 is a section taken along the line 10—10 in Fig. 6. Fig. 11 is an enlarged view of the bottom former showing its operating means and support in section. Fig. 12 is a somewhat diagrammatic perspective view showing the sheet of paper or foil being fed toward the forming mandrel in which the tapes rest on the mandrel and the lower grip wheels are free. Fig. 13 is similar to Fig. 12 but showing the lower grip wheels raised and having just pulled the paper loose from the following sheet. In this instance the tapes are raised free of the mandrel. Fig. 14 is similar to Fig. 12 but showing the roll of paper upon the mandrel and with the mandrel blade lowered thereby throwing the paper in toward the center ready for the bottom former which is just about to function. Fig. 15 is similar to Fig. 12 but showing the bottom former pressed against the end of the mandrel thus forming the bottom of the paper container. Fig. 16 is similar to Fig. 12 but showing the completed container being ejected to a position where the throw-out wheels (not shown in this view) will remove it from the push-out rod. Fig. 17 shows the completed container with portions broken away to show the construction.

Similar number of reference refer to similar parts throughout the several views.

Referring in detail to the drawings, in order to best illustrate this machine its product will first be described. Same consists of a cylinder of paper or metal foil wrapper 20 whose edge 21 is not fastened in any way, but whose bottom 22 is formed by plunging the edge 23 inwardly and pressing same to a flat shape to form a suitable tight bottom for the container.

The machine itself includes a base 24 upon which are secured the side frames 25 and 26 on which are formed the two upright supports 27 which support the shaft 28 of the spool 29 on which is wound the paper or foil 30 from which the containers are to be made.

Journaling between the members 25 and 26 are the two rolls 31 and 32 which are provided with shafts 33 which journal in suitable bearings in the members 25 and 26. The roll 31 is provided with a soft rubber strip 34 along its length and the roll 32 is provided with a knife 35 whose serrated edge 36, which contains the large notches 37, is used to perforate the paper.

The knife 35 itself is held in the slot 38 by the screws 39. On each side of the exposed portion of the knife 35 is placed a slidable stripper bar 40 which is urged outwardly by the springs 41 and is limited in its outward travel by the heads of the screws 42.

It is preferable to provide an adjustment between the centers of the rolls 31 and 32 and this is accomplished by urging the upper roller downwardly by means of the springs 43 whose tension may be varied by the screws 44 in the cap 45.

It is preferable to pass the paper web 46 around the rolls 47 and 48 before passing same through the rolls 31 and 32. In the path of the on-coming paper web 46 is placed the mandrel 49 which is mounted on a shaft 50 which journals in the side frame 26. A guard 51 is placed around the mandrel 49 and its upper end 52 catches the paper web 46 and guides it around the mandrel. Above the web 46 is placed a carrier tape 53 which is mounted on the rolls 54, and below the web 46 is placed a second carrier tape 55 which is mounted on the rolls 56.

Between the runs of the tape 53 is mounted a roll 57 on whose shaft 58 are pivotally mounted the arms 59 across which is supported a roll 60 between the runs of the tape 55. From the shaft 58 is also supported an arm 61 which supports the rolls 54. The end 62 of the arm 61 projects beyond the further roll 54. A spring arm 63 is also attached to the shaft 58 and is urged downwardly by the spring 64.

Within the mandrel 49 is placed an ejector rod 65 on whose end is placed a recessed head 66 adapted to normally occupy a position within the mandrel 49 and to be ejected therefrom by the lever 67, which is joined to the rod by the links 68. The lever 67 is mounted on a pivot 69 on the standard 70 which projects from the side of the frame 26. A spring 71 urges the projecting end 72 of the lever 67 toward the frame 26 which, owing to the arrangement of parts, causes the head 66 to be spring-urged from the mandrel 49 when lever 67 is moved inwardly by the cam 77.

The lever 67 is preferably formed of two parts which are pivotally joined by means of the screw 73. The over-lapping ends 74 and 75 are urged together by the springs 76. The object of these springs is to prevent breakage if an obstruction is in the path of the head 66. The lever 67 is operated by a cam 77 on the shaft 33, which also carries a cam 79 which operates the lever 80 for rocking the shaft 81 which journals across the frames 25 and 26.

On the outside of the frame 25 is mounted a gear 82 which is secured to the shaft 33 of the roll 31. The gear 82 is driven by the pinion 83 on the shaft 84 which has a second pinion 83$^a$ on its other end that, in turn, meshes with the pinion 85 on the shaft 86, which carries the sprocket 87 whose chain 88 passes around the sprocket 89 on the shaft 90 which carries a sprocket 91 which, in turn, drives the chain 92 on the sprocket 93, which drives the mandrel 49 through its shaft 50. On the shaft 50 is also a pinion 95 which meshes with the gear 96 on the shaft 97 which, in turn, carries the lower grip rolls 98 for which slots 99 are provided in the guard 51.

The shaft 97 is mounted on the arm 100 which is pivotally mounted by the shaft 81 which is rocked by the lever 80. The arm 100 is urged upwardly by the spring 101 on the rod 102 which tends to mesh the gear 96 with the pinion 95 whenever permitted to do so by the cam 79.

The shafts 33 are provided with the gears 106 which hold the rolls 31 and 32 in their true relation through the medium of the idler pinions 104 whether the gears 103 are in mesh with each other or not.

On the shaft 33 of the roll 31 is mounted a cam 105 which engages a roll 106 on the lever 107 on the shaft 90—A. On the shaft 90—A is also mounted an arm 108 which is operated by the lever 107 through the springs 109, which transmit power through the short lever 110 on the shaft 90—A. On the outer end of the arm 108 are the links 111 which operate the vertical plunger 112 which slides in the guide 113 and has formed on its upper end a cam 114. The plunger 112 is urged downwardly by the spring 115. In the side of the plunger 112 is formed a rack 116 which meshes with the pinion 117 on the shaft 118 which actuates the bottom-forming head 119.

Directly in front of the discharge end of the mandrel 49 are mounted the opposed concave rolls 120 on the shafts 121 which are mounted in the standards 122. The shafts 121 are rotated by a pulley 123 which is driven by a round belt 124 which passes around the idler shafts 125 and the drive pulley 126.

The cam 114 engages the lever 127 which is pivotally mounted on the shaft 128, and through the spring 129 drives the arm 130 which carries the crimping lug 131. It is preferable to provide the lever 127 with a stop 132 in order that initial tension may be provided in the spring 129.

The operation of the device is as follows: Paper or foil is placed in roll form on the spool 29 and is threaded around the rolls 47 and 48 and then between the rolls 31 and 32. When the machine is operated the tapes 53 and 55 are pressing closely to the upper and lower sides of the web 46 and carried along to the under side of the guard edge 52 in contact with the rotating mandrel 49.

The rotation of the mandrel is slightly faster than the feed of the rolls 31 and 32 causing the paper to tear along the perforated line 133, which perforation was caused by the knife 35 as the rolls 31 and 32 were rotated. In fact, the paper is completely severed, except for the narrow sections caused by the notches 37 in the knife 35. The continued rotation of the mandrel 49 now forms the severed paper into a complete cylinder. The next movement of the machine is caused by the cam 114 which folds the projecting end of the paper toward the center of the mandrel.

It is now possible for the bottom forming head 119 to function and to tightly press the material into the hollow end of the recessed head 66. The bottom forming head 119 now moves back out of the way and the ejector rod 65, with its head 66, pushes the completed cylinder off from the mandrel 49 between the concave rolls 120 by means of which they are completely ejected from the machine. It will be seen that inasmuch as the bottom-forming head 119 does not rotate with the mandrel, the paper in pressure contact with the head and cup 66 will be given more or less of a twist around the axis of the mandrel, thus more tightly folding and compressing the paper together in a way tending effectually to seal the bottom against leakage.

For the sake of illustration there is shown a drive pulley 134 through which power is transmitted to the hub 133 of the sprockets 89 and 91.

It will be noted that when the lower grip rolls 98 come in contact with the paper (as shown in Fig. 13) that the feeding tapes 53 are raised by the action of the rod 135 which projects upwardly from an arm 100 and engages the under side of the projecting end 62 of the member 61. This permits the newly severed piece of paper to move along at the increased mandrel speed without any retarding action from the tapes themselves.

It is obvious that many variations of mechanisms can be employed to secure the results aimed at in the above described mechanism; it is therefore not our intention to limit ourselves to this precise arrangement of parts or mechanisms, but we do intend to cover all such forms and modifications thereof as fall fairly within the appended claims.

We claim:

1. A machine for making paper cylinders having, in combination, a pair of cutoff rolls for feeding a web of paper and partially cutting same into required lengths; a rotatable mandrel around which said partially severed sheet can be wound; presser rolls adapted to bear against said mandrel while paper is being wound thereon; web means for feeding said paper toward said mandrel and adapted to release said paper as soon as it is held by said presser wheels; a crimping arm for turning an over-hanging edge of paper inwardly against said mandrel; a recessed head in one end of said mandrel beyond which said paper projects; a bottom forming head for turning said inturned edge against said recessed head; and means for removing the formed cylinder from said mandrel.

2. In a machine for making paper cylinders, the combination of a rotatable mandrel having a recessed plunger in one end thereof and having a guard around the major portion of said mandrel spaced therefrom, said guard having slots formed therein exposing portions of said mandrel; presser wheels adapted to engage said mandrel through said slots when paper is being wound thereon; tape means for guiding paper into the space between said mandrel and guard at a speed below mandrel speed; means for releasing said tape from said paper after it has been caught by said presser wheels; means for forming one edge of the paper inwardly against said mandrel end; and means for removing the paper cylinder from said mandrel when completed.

3. A machine for forming paper cylinders including a pair of spaced side frames; means for mounting a roll of paper between said frames; feed rolls adapted to draw paper from said roll of paper and perforate same at fixed lengths; a mandrel projecting inwardly from one of said frames across the path of said paper; webs for guiding said paper to said mandrel; presser wheels urged toward said mandrel while paper is being wound thereon, said mandrel having means for rotating same at a greater peripheral speed than do said feed rolls; means for disengaging said webs from said paper strip after it is held by said mandrel and presser wheels; a crimping arm for turning one edge of the paper being wound on said mandrel inwardly toward the axis of the mandrel; a recessed plunger forming an end for said mandrel beyond which said paper first projects; a bottom forming head adapted to form said inturned edge against the bottom of said recessed plunger; means for moving said plunger out of said mandrel in a manner to move said cylinder off of said mandrel; and means for removing said cylinder from said plunger.

4. In a cylinder forming machine, a paper roll support; a mandrel; means to rotate said mandrel for winding the paper from said roll into cylinders; primary paper feeding means to draw the paper from the roll and direct it toward the mandrel; means cooperative with said primary feeding means to divide the paper into lengths and partially sever the lengths from the roll of paper; secondary paper feeding means for directing the partially severed lengths to the mandrel; means to start the paper on the mandrel; means to render said secondary feeding means inoperative on the section of paper which has been started on the mandrel; means to rotate the mandrel at a greater speed than that of the paper feeding means whereby to break the started section of paper from the next following section; and means to turn over one end of the paper cylinder on the mandrel and close said end.

5. In a cylinder forming machine, a paper roll support; a mandrel; means to rotate said mandrel for winding the paper from said roll into cylinders; primary paper feeding means to draw the paper from the roll and direct it toward the mandrel; means cooperative with said primary feeding means to divide the paper into lengths and partially sever the lengths from the roll of paper; secondary paper feeding means for directing the partially severed lengths to the mandrel; means to start the paper on the mandrel; means to render said secondary feeding means inoperative on the section of paper which has been started on the mandrel; means to rotate the mandrel at a greater speed than that of the paper feeding means whereby to break the started section of paper from the next following section; said paper feeding means being arranged to deliver the paper to the mandrel so as to overlap one end of the mandrel; and means to turn over and press in the overlapped paper to form a closed end for the cylinder.

6. In a cylinder forming machine, a paper roll support; a mandrel; means to rotate said mandrel for winding the paper from said roll into cylinders; primary paper feeding means to draw the paper from the roll and direct it toward the mandrel; means cooperative with said primary feeding means to divide the paper into lengths and partially sever the lengths from the roll of paper; secondary paper feeding means for directing the partially severed lengths to the mandrel; means to start the paper on the mandrel; means to render said secondary feeding means inoperative on the section of paper which has been started on the mandrel; means to rotate the mandrel at a greater speed than that of the paper feeding means whereby to break the started section of paper from the next following section; means to turn over one end of the paper cylinder on the mandrel and close said end, and means associated with the mandrel for delivering the finished cylinder from the machine.

7. In a cylinder forming machine, a paper roll support; a mandrel; means to rotate said mandrel for winding the paper from said roll into cylinders; primary paper feeding means to draw the paper from the roll and direct it toward the mandrel; means cooperative with said primary feeding means to divide the paper into lengths and partially sever the lengths from the roll of paper; secondary paper feeding means for directing the partially severed lengths to the mandrel; means to start the paper on the mandrel; means to render said secondary feeding means inoperative on the section of paper which has been started on the mandrel; means to rotate the mandrel at a greater speed than that of the paper feeding means whereby to break the started section of paper from the next following section; said paper feeding means being arranged to deliver the paper to the mandrel so as to overlap one end of the mandrel; means to turn over and press in the overlapped paper to form a closed end for the cylinder; and means associated with the mandrel for delivering the finished cylinder from the machine.

8. In cylinder forming machines the following elements in combination: a rotating mandrel; a paper feeding and weakening means; a crimper; a cylinder forming head; a cylinder stripper; cylinder discharging means and means associated with said mandrel for breaking sections of paper from the strip along the weakened places for the purpose specified.

9. In cylinder forming machines, the following elements in combination: a paper roll holder; a paper feeding and weakening mechanism; a rotatable mandrel; a paper guide around the mandrel; a presser roll to cooperate with the mandrel; means to turn over an end of the cylinder on the mandrel; means to press tightly the turned over paper to close the end of the cylinder; means to strip the finished cylinder from the mandrel and deliver it from the machine and means to rotate the mandrel faster than the action of the paper feeding means for the purpose specified.

10. In cylinder forming machines, the following elements in combination: a paper roll holder; a paper feeding and severing mechanism; a rotatable mandrel; a paper guide around the mandrel; a presser roll to cooperate with the mandrel; means to turn over an end of the cylinder on the mandrel; means to press tightly the turned over paper to close the end of the cylinder; means to strip the finished cylinder from the mandrel and deliver it from the machine; said paper feeding and severing mechanism comprising a primary feeding and paper cutting means and a secondary feeding means to move the paper from the primary means to the mandrel.

11. In cylinder forming machines, the following elements in combination: a paper roll holder; a paper feeding and severing mechanism; a rotatable mandrel; a paper guide around the mandrel; a presser roll to cooperate with the mandrel; means to turn over an end of the cylinder on the mandrel; means to press tightly the turned over paper to close the end of the cylinder; means to strip the finished cylinder from the mandrel and deliver it from the machine; said paper feeding and severing mechanism comprising a primary feeding and paper cutting means and a secondary feeding means to direct the paper from the primary means to the mandrel; and means to release said secondary feeding means from the paper and applying said presser roll to the paper on the mandrel.

12. In cylinder forming machines, a paper roll holder; a continuously operating paper feeding means for drawing strip paper from the roll, a rotating mandrel toward which said feeding means directs the paper, means for effecting transverse weakened portions in the paper at definite intervals during transit from roll to mandrel; means causing said mandrel to break sections of paper from the strip along the weakened place and wind same around the mandrel, means associated with the mandrel for turning over and compressing one end of the paper cylinder on the mandrel to form a bottom to the cylinder, and means to deliver the compressed cylinder from the mandrel.

13. In cylinder forming machines, a rotatable mandrel; a paper roll holder; a paper strip feeding means; said feeding means including feeding rollers provided with paper cutters for effecting a partial severance of the paper along transverse lines at intervals in its length; means for rotating the mandrel at a greater speed than the feeding mechanism; and intermittently operating means for pressing the paper to the mandrel whereby said mandrel will break the paper sections from the strip along the partially severed lines.

14. In cylinder forming machines, a rotatable mandrel; a paper roll holder; a paper strip feeding means; said feeding means including feeding rollers provided with paper cutters for effecting a partial severance of the paper along transverse lines at intervals in its length; means for rotating the mandrel at a greater speed than the feeding mechanism; and intermittently operating means for pressing the paper to the mandrel whereby said mandrel will break the paper sections from the strip along the partially severed lines, said feeding means including an intermittently operable secondary feeding device for taking the paper strip from the primary feeding elements and delivering the same to the mandrel.

WILSON R. MYERS.
BERNHARD O. OPITZ.